United States Patent [19]

Cummins, II

[11] 4,333,827

[45] Jun. 8, 1982

[54] AUTOMATIC ENGINE SHUT DOWN DEVICE AND SYSTEMS EMPLOYING THE SAME

[75] Inventor: Charles A. Cummins, II, Lutherville, Md.

[73] Assignee: APT Inc., Annapolis Junction, Md.

[21] Appl. No.: 178,109

[22] Filed: Aug. 14, 1980

[51] Int. Cl.$^3$ .............................................. B01D 1/00
[52] U.S. Cl. .................................... 210/100; 210/258; 210/416.3; 123/332; 417/46
[58] Field of Search ...................... 210/100, 258, 416.2, 210/416.3, 416.5; 123/332; 417/20, 43, 46, 34

[56] References Cited

U.S. PATENT DOCUMENTS

| | | | |
|---|---|---|---|
| 2,634,681 | 4/1953 | Rowell | 417/34 |
| 3,567,338 | 3/1971 | Edwards | 417/34 |
| 3,756,747 | 9/1973 | Caffrey | 417/34 |
| 3,797,967 | 3/1974 | Howeth | 417/34 |
| 3,806,279 | 4/1974 | Ostwald | 417/34 X |
| 3,825,120 | 7/1974 | Takahashi | 210/258 X |
| 3,864,059 | 2/1975 | Smith | 417/20 |

FOREIGN PATENT DOCUMENTS 150480  3/1953  Australia ............................ 210/100

*Primary Examiner*—John Adee
*Attorney, Agent, or Firm*—Wenderoth, Lind & Ponack

[57] ABSTRACT

An automatic engine shut down device is operable in a system of the type including a pump having a suction inlet and a pressure discharge for discharging a liquid at a operational pressure, an engine for driving the pump, the engine being operable by an engine operating fluid, the engine including a control member for controlling the supply of engine operating fluid to the engine, the control member being movable between a first open position allowing operation of the engine and a second closed position shutting down operation of the engine. The automatic shut down device is operable, upon the removal or substantial reduction of suction at the inlet of the pump, to automatically terminate operation of the engine and thereby of the pump.

30 Claims, 4 Drawing Figures

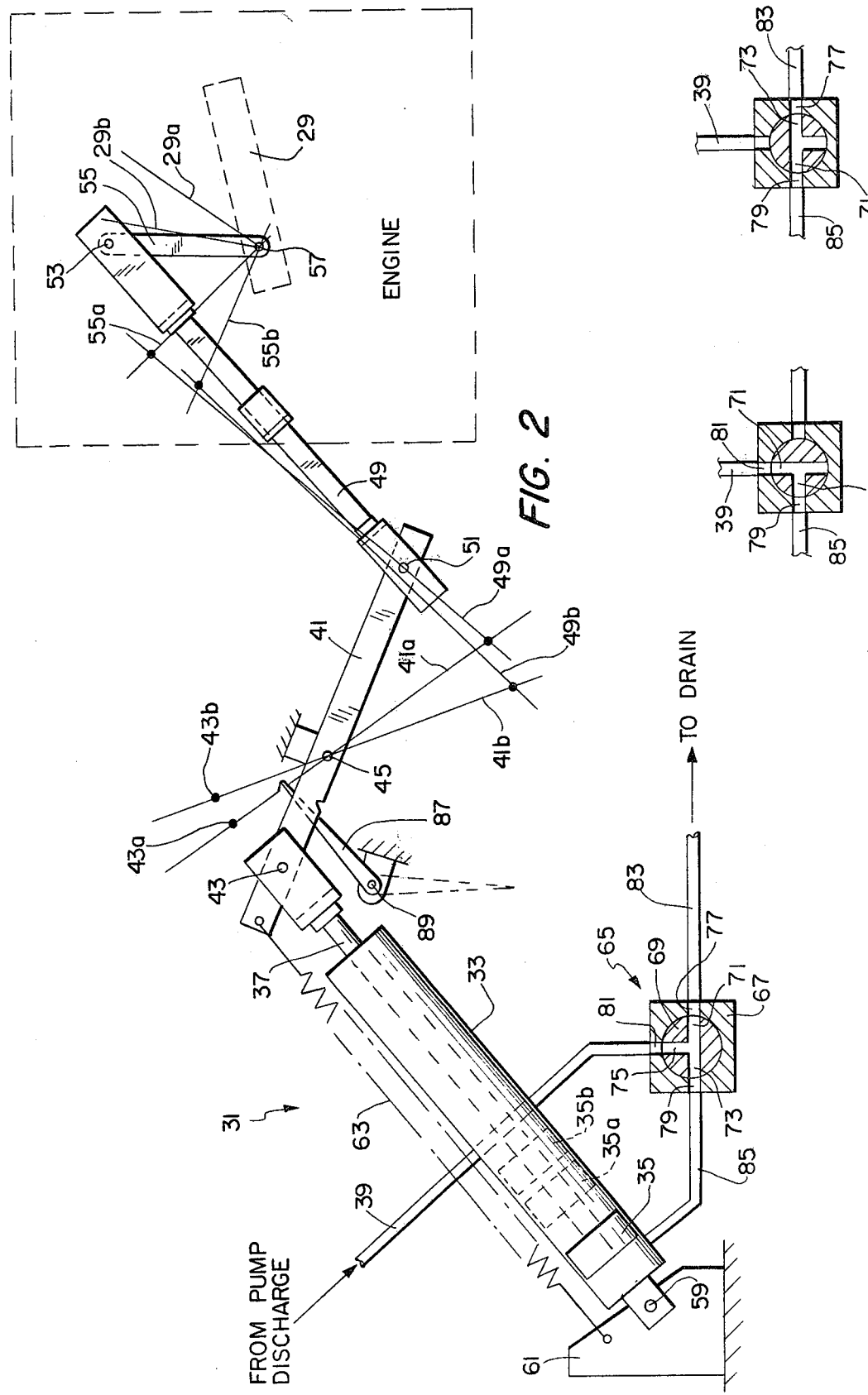

AUTOMATIC ENGINE SHUT DOWN DEVICE AND SYSTEMS EMPLOYING THE SAME

BACKGROUND OF THE INVENTION

The present invention is directed to an automatic engine shut down device and to systems incorporating such device.

More particularly, the present invention is directed to such a device for use in a system of the type including a pump and an engine operating the pump, whereby the shutdown device operates, at the occurrence of the removal or substantial reduction of suction at the inlet of the pump to automatically shut down the engine, thereby preventing damage to the pump.

More specifically, the present invention is directed to a compact, portable water purification system for producing potaable drinking water from contaminated or turbid water, such system employing the automatic engine shut down device.

There are known various purification systems for purifying contaminated or turbid water to produce potable drinking water. Such known systems include various filters and purifying devices, a pump to pump contaminated water through the filters and purifying devices, and an engine for operating the pump.

However, such known systems suffer from the inherent disadvantage that should the suction at the inlet of the pump be substantially reduced or removed, continued operation of the pump will cause severe damage to the pump. Thus, it is, of course, a known fact that an engine transmits energy to the device which it drives, in this case a pump. In the event that the pump flow stops due to loss of suction at the inlet of the pump, with the engine continuing to run, the energy transferred from the engine to the pump will convert to heat and eventually cause severe damage to the pump.

Systems are known for automatically shutting down the engine when electrical power is available, such systems employing flow switches or pressure switches operating control valves.

U.S. Pat. No. 2,634,681 discloses a system for reducing engine speed upon loss of fluid being pumped by a pump. U.S. Pat. No. 3,567,338 discloses a system whereby reduction of pump pressure causes an engine spark plug to be shorted out, thereby stopping the engine. U.S. Pat. Nos. 3,756,747 and 3,806,279 disclose governor systems for compressors wherein an increase in compressor pressure decreases engine speed. U.S. Pat. No. 3,864,059 discloses a closed hydraulic system whereby engine speed and torque output are regulated to meet load demand.

All such known systems, however, fail to solve the problem of automatically shutting down an engine, upon the removal or substantial reduction of suction at the inlet of a pump, by physically removing a supply of fuel or engine driving fluid to the engine.

SUMMARY OF THE INVENTION

With the above discussion in mind, it is a primary object of the present invention to provide an automatic engine shut down device for automatically ceasing operation of an engine which drives a pump upon the occurrence of the removal or substantial reduction of suction at the inlet of the pump.

More particularly, the present invention is directed to such a device for use with an engine which is operable by an engine operating fluid and which includes a control member for controlling the supply of the engine operating fluid to the engine.

A further object of the present invention is to provide such an automatic engine shut down device employed in conjunction with a compact, portable water purification system for producing potable drinking water from contaminated or turbid water.

These objects are achieved in accordance with one aspect of the present invention by the provision of a compact, portable water purification system for producing potable drinking water from contaminated or turbid water, such system including a pump having a suction inlet and a pressure discharge for withdrawing contaminated or turbid water from a source thereof and for discharging such water at an operational pressure, a strainer for receiving the water from the pump and for straining the water, a pre-filter for receiving the water from the strainer and for removing particles from the water, a primary filter for receiving the water from the pre-filter and for filtering bacteria from the water, a purifier unit for receiving the water from the primary filter and for purifying the water to remove therefrom residual bacteria and viral pathogens and for discharging the water as potable drinking water, and an engine for driving the pump, the engine being operable by an engine operating fluid. The engine includes a control member for controlling the supply of the engine operating fluid to the engine, the control member being movable between a first position, whereat the control member allows access of the engine operating fluid to the engine and thereby enables operation of the engine and thus of the pump, and a second position, whereat the control member blocks access of the engine operating fluid to the engine and thereby prevents operation of the engine and thus of the pump. The system further includes an automatic engine shut down device for, upon removal or substantial reduction of suction at the inlet of the pump, automatically terminating operation of the engine and thereby of the pump and for thus preventing damage to the pump. The automatic engine shut down device includes a pressure responsive device, operatively connected to the control member and responsive to the discharge pressure at the discharge of the pump, for moving the control member to the first position thereof when the discharge pressure is above a predetermined level, and a biasing structure, operatively connected to the control member and operable in opposition to the discharge pressure, for moving the control member to the second position thereof when the discharge pressure drops below the predetermined level as a result of the removal or substantial reduction of suction at the inlet of the pump.

In accordance with another aspect of the present invention, there is provided an assembly including the above-mentioned pump, engine and automatic engine shut down device.

In accordance with an even further aspect of the present invention is provided the above discussed automatic shut down device for use in a system of the type including a pump and an engine driving such pump.

The pressure responsive device may include, in accordance with a preferred arrangement of the present invention, a cylinder, a piston movable within the cylinder, a piston rod connected to the piston and extending outwardly of the cylinder, structure connecting the piston rod to the control member, and passages or conduits supplying the discharge pressure to the cylinder, such that the discharge pressure moves the piston and the piston rod with respect to the cylinder.

The connecting structure may include a lever arm having a first end pivotally connected to the piston rod and a second end operatively connected to the control member, the lever arm being pivotally mounted at a position between the first and second ends thereof about a fixed pivot. The connecting structure may further include a lever rod having a first end pivotally connected to the second end of the lever arm and a second end, and a valve lever having a first end pivotally connected to the second end of the lever rod and a second end fixedly connected to the control member.

The biasing structure may comprise a spring connected to the first end of the lever arm and operable to move the piston rod in a direction inwardly of the cylinder.

In accordance with a further feature of the present invention, there may be provided a manual positioning structure for, when operation of the engine is stopped, being manually positioned in engagement with the lever arm to maintain the lever arm in a position such that the control member is partially moved toward the first position thereof in opposition to the biasing structure, such that the engine may then be started, whereafter running of the engine causes the pump to build up the discharge pressure, thereby causing the piston rod to further move the lever arm to move the control member to the first position thereof, such that the manual positioning structure is released from the lever arm.

In accordance with a further feature of the present invention, there is provided an arrangement for selectively manually terminating the operation of the engine, such arrangement comprising a valve assembly located in the passage or conduit, to enable interruption of communication of the discharge pressure to the cylinder and for discharging the cylinder at the second side of the piston therein to a drain. It is thereby possible to drain the pressure responsive device of fluid, such as water, therein.

BRIEF DESCRIPTION OF THE DRAWINGS

Other objects, features and advantages of the present invention will be apparent from the following detailed description thereof, taken in conjunction with the accompanying drawings, wherein:

FIG. 2 is an enlarged schematic diagram in more detail of the engine shut down device of FIG. 1; and FIGS. 3 and 4 are schematic sectional views illustrating various valve positions employed during operation of the device of FIG. 2.

DETAILED DESCRIPTION OF THE INVENTION

Figure 1:
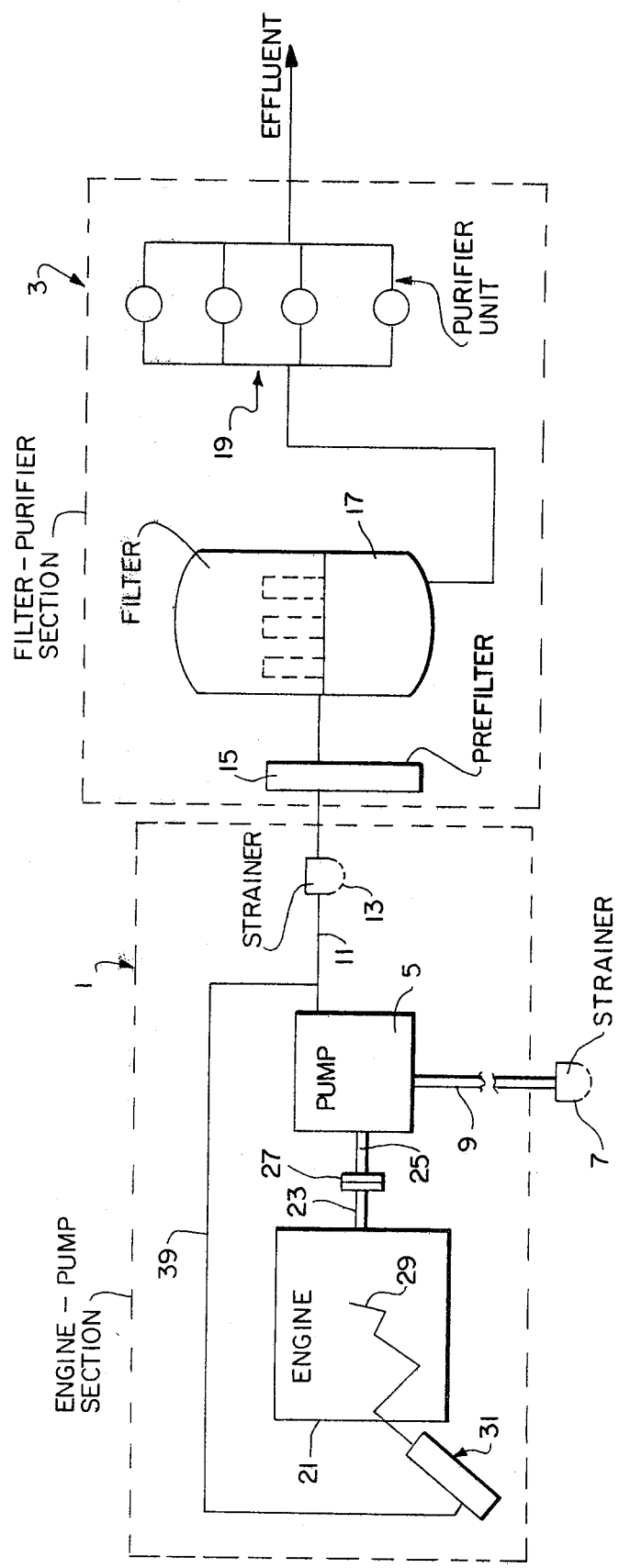
FIG. 1 is a schematic diagram of a water purification system including an engine shut down device in accordance with the present invention.

With reference now to FIG. 1 of the drawings there will be described in detail a compact, portable water purification system for producing potable drinking water from contaminated or turbid water in accordance with one aspect of the present invention.

The water purification system includes an engine-pump section 1 and a filter-purifier section 3. In accordance with a particularly advantageous feature of the present invention, the engine-pump section 1 and the filter-purifier section 3 may each be formed and manufactured as separate compact, portable units which may be packaged for easy and quick transportation to areas of need.

The section 1 includes a pump 5 for withdrawing contaminated or turbid water from a source thereof (not shown), for example via a strainer 7 and hose 9 into a conventional suction inlet and for discharging such water from a conventional pressure discharge, for example through conduit 11. The water is then successively pumped through strainer 13, pre-filter 15, primary filter 17 and purifier unit 19, and is then discharged as a potable drinking water effluent. In FIG. 1, the strainer 13 is shown as being incorporated within engine-pump section 1, however the strainer 13 could equally be incorporated within the filter-purifier section 3.

The specific components or elements forming the pump 5, strainer 13, pre-filter 15, primary filter 17 and purifier unit 19 are not in and of themselves particularly critical to the present invention, in as much as such elements may comprise otherwise known and commercially available such elements. Such elements must be designed so that in combination they achieve a desired level of purification of a desired quantity of a particular contaminated water. It has been found that the following specific components result in a desirable overall water purification system. Pump 5 is preferably a centrifugal pump having a low net positive suction head requirement. However, other conventional types of pumps, for example a turbine vane pump could be employed. The strainer may be of the "Y" type with a 1.5" size, having NO. 20 brass or stainless steel mesh and 0.75" full port ball blow down valve. Pre-filter 15 is preferably a Ronningen-Petter duplex fabric bag back washable filter unit including a pair of parallel filter bags of a mesh size of from 1 to 3 microns and capable of removing 95% of all particles of a size of 3 microns or larger. The primary filter 17 may be a final polish filter capable of removing bacteria and all particles 0.2 microns in size and larger, and may specifically be such a filter unit of the type manufactured by Katadyn Products Ltd. The purifier unit 19 may be a system employing known purifying agents such as chlorine, iodine or iodine ion resins.

As indicated above, however, other known components may be used as will be apparent to those skilled in the art.

The engine-pump section 1 further includes engine 21 for driving pump 5, for example by engine output shaft 23 adapted to be engaged with pump input shaft 25 by means of coupling 27, in a conventional manner. Engine 21 is operable exclusively by an engine operating fluid. As employed herein the term "engine operating fluid" refers to a fuel, for example, gasoline or diesel fuel, combustion air, or any other engine driving force, for example steam, compressed air, etc. The engine 21 includes an otherwise known control member 9 for controlling the supply of the engine operating fluid to the engine. The control member 29 is movable between a first position, whereat the control member allows access of the engine operating fluid to the engine and thereby enables operation of the engine and thus of the pump, and a second position, whereat the control member 29 blocks access of the engine operating fluid to the engine 21 and thereby prevents operation of the engine and thus of the pump. Thus, control member 29, shown only schematically in the drawings, may correspond to various known valves or valve elements which operate to open or block passage of a respective engine operating fluid to operable components of the respective engine.

In the event that the suction at the inlet of the pump 5 becomes removed or substantially reduced, for example, due to clogging of the strainer 7 or hose 9, or due to emptying of the source of contaminated or turbid water, and if the engine 21 continues to operate the pump 5, then the pump will eventually be severely damaged.

The present invention provides a novel automatic engine shut down device, represented generally at 31 in FIG. 1, for preventing this type of disadvantageous operation.

Thus, if suction is removed or substantially reduced from the inlet of pump 5, the pump 5 will loose its ability to pump liquid. As a result, the discharge pressure at the discharge of the pump will be reduced. In accordance with the present invention the automatic engine shut down device 31 detects this discharge pressure drop and moves the engine control device 29 to cut-off supply of the engine operating fluid to the engine, thereby stopping operation of the engine, and thus also stopping operation of the pump 5.

The automatic engine shut down device 31 will be described in more detail with reference to FIGS. 2-4 of the drawings. Thus, the shut down device includes a pressure responsive structure operatively connected to control member 29 and responsive to the discharge pressure at the discharge of the pump 5 for moving the control member 29 to the open first position thereof when the discharge pressure is above a predetermined level. The shut down device 31 also includes biasing structure operatively connected to the control member 29 and operable in opposition to the discharge pressure for moving the control member 29 to the second closed position thereof when the discharge pressure drops below the predetermined level.

The pressure responsive structure may take numerous forms as will be apparent to those skilled in the art. However, a particularly preferred arrangement of the pressure responsive structure includes a cylinder 33 having movably positioned therein a piston 35. A piston rod 37 is connected to a first side of piston 35 and extends outwardly of cylinder 33. A passage or conduit 39 connects and supplies the discharge pressure at the discharge pump 5 into the interior of cylinder 33 at a second side of piston 35, such that the discharge pressure urges the piston rod 37 in a direction outwardly of cylinder 33.

If space permits, the cylinder 33 may be aligned such that the piston rod 37 is directly connected to control member 29 of engine 21. However, when space does not permit such a direct connection, the invention includes connecting structure for connecting the piston rod 37 to the control member 29. Specifically, such connecting structure may include a lever arm 41 having a first end pivotally connected, as at 43, to piston rod 37 and a second end. The lever 41 is pivotally mounted at a position between the first and second ends thereof about a fixed pivot 45. A lever rod 49, which may be provided adjacent the mid-length portion thereof with adjustment means, is pivotally connected at a first end thereof, for example as at 51, to the second end of lever arm 41. A second end of lever rod 49 is pivotally connected, as at 53, to a first end of a valve lever 55 having a second end fixedly connected, as at 57, to control member 29.

The end of cylinder 33 which is opposite the piston rod 37 may be pivotally connected, as at 59, to a fixed member, schematically shown at 61.

The biasing structure may include a spring 63 extending between and connected to the first end of lever arm 41 and the structure 61. Other biasing structures will be apparent to those skilled in the art. Specifically, the biasing structure could include a coil spring positioned within cylinder 33 coaxially surrounding piston rod 37 and urging piston 35 downwardly as viewed in FIG. 2.

In accordance with a further feature of the present invention there is provided a valve assembly within the passage or conduit 39. Specifically, as illustrated in FIG. 2, there is provided a three-way valve 65 including a valve body 67 having rotatably mounted therein a valve member 69 having therein a T-shaped passage including passage portions 71, 73, 75 adapted to be aligned with, upon rotation of valve member 69, various of ports 77, 79, 81 within valve body 67. Port 77 is permanently aligned with a drain connection 83. Port 79 is permanently connected via conduit 85 with the interior of cylinder 33 at a position adjacent the second side of pistion 35. Port 81 is permanently connected to passage or conduit 39 leading from the discharge of pump 5.

The operation of the system of FIGS. 1 and 2 will now be described in more detail.

At a time when the engine 21 and pump 5 are shut-off, the automatic engine shut-off device 31 will be in the position shown by the solid lines in FIG. 2, and control member 29 of engine 21 will be in the position shown by dashed lines in FIG. 2. At this position, control member 29 blocks communication of the particular engine operating fluid to the engine. At this point, the three-way valve 65 is in the position shown in FIG. 2, such that the interior of the entire system is connected to the drain.

When it is desired to start the engine 21, the lever rod 49 is moved downwardly as viewed in FIG. 2, or lever arm 41 is moved clockwise as viewed in FIG. 2 to the intermediate straight line positions shown at 49a and 41a, respectively, in FIG. 2. At this position of lever arm 41, a manual run positioning element 87 is pivoted about a pivot 89 and is abutted against lever arm 41, thereby maintaining lever arm 41 in the intermediate position 41a against the biasing force of spring 63. At this position, valve lever 55 is moved to the intermediate straight line position 55a, thereby moving control member 29 to an intermediate open position, between the normal open and closed positions thereof, as indicated by intermediate straight line 29a in FIG. 2. This accordingly moves the first end of lever arm 41 and the outer end of piston rod 37 to an intermediate position indicated at 43a, and moves piston 35 to the intermediate position shown by dashed lines at 35a. Valve member 69 of three-way valve 65 is rotated to the position shown in FIG. 3 of the drawings. Thus, port 81 connects conduit 39 with passage portion 71 which is connected via passage portion 75 and port 79 with conduit 85 and the interior of cylinder 33. Passage portion 73, port 77, and drain conduit 83 are blocked. In this position of the apparatus, the engine may be started in a normal manner, for example, by means of a manual rope start. In a specifically preferred arrangement of the present invention, engine 21 is a diesel engine started by a manual rope start and does not include any electric starting features. Due to the fact that control member 29 is in an intermediate open position, as shown at 29a, the engine 21 may be successfully started. After the engine is started, the pump is thus operated, and the pump discharge pressure gradually builds up and is communicated through conduit 39 and the valve arrangement shown in FIG. 3 to the interior of the cylinder 33 at the side of the piston 35 opposite the piston rod 37. As this pressure continues to build up, piston 35 is further moved against the biasing force of spring 63 to the fully opened position shown at 35b. This moves piston rod 37 further outwardly and further pivots lever arm 41 in the clockwise direction around pivot 45 until pivot 43 is at the position indicated by 43b and the lever arm is at the position indicated by fully opened straight line position 41b. At this time, the manual run positioning element 87 is no longer held in position by lever 41 and drops, for example by gravity, to the dashed line position shown in FIG. 2 of the drawings. This movement of lever arm 41 to the position of 41b moves lever rod 49 to the position shown by 49b, moves the valve lever 55 to the fully open straight line position shown by 55b, and thus moves the control member 29 to the fully open position thereof shown by straight line 29b.

It will be apparent that with the engine and pump running, with the control member 29 in the position 29b thereof, and with the automatic engine shut down device 31 in the open or extended position thereof, if the pump suffers a loss or substantial reduction in suction at the inlet of the pump, such suction reduction will cause a drop in the discharge pressure at the discharge of the pump. This loss in pressure will be communicated through the valving position shown in FIG. 3 to the lower side of piston 35. Since the reduced pressure on the lower side of piston 35 within cylinder 33 is insufficient to overcome the biasing force of spring 63, spring 63 will promptly move all of the elements of the automatic engine shut down device 31 to the solid line positions thereof, shown in FIG. 2 of the drawings, i.e. to thereby close the control member 19 and to prevent furaccess of the engine operating fluid to the engine. This will, of course, result in immediate shut down of the engine 21, and thereby will prevent further operation of the pump 5. This will, of course, prevent continued running and damage to the pump.

With the engine and pump running in the normal operative positions as discussed above, in the event that it is desired to shut down the engine and pump, this may be achieved in accordance with the present invention by simply rotating the valve member 69 of three-way 65 from the position shown in FIG. 3 to the position shown in FIG. 4 of the drawings. Thus, communication of the discharge pressure through the conduit 39 to the interior of the cylinder 33 is cut-off. Additionally, the interior of cylinder 33, at a position below the piston 35, is discharged to the drain through conduit 85, port 79, passage portions 71, 73, port 77, and conduit 83. This will enable spring 63 to move lever arm 41 counterclockwise around pivot 45, with the result that the piston rod 37 and piston 35 are moved downwardly to the solid line positions thereof. Simultaneously, lever rod 49, valve lever 55 and control member 29 will be moved to the original closed positions thereof. This of course will shut off access of the engine operating fluid to the engine, and thereby shut down the engine. This also allows draining from cylinder 33 of any water therein. When valve 65 is moved to the position of FIG. 2, water will also be drained from conduit 39.

Although the present invention has been described and illustrated with regard to a specifically preferred embodiment thereof, it is to be understood that various modifications and alterations may be made to the specifically described and illustrated arrangement without departing from the scope of the present invention. Thus, as discussed above, the various elements of the system illustrated in FIG. 1 may be other than those specifically described. Furthermore, the three-way valve 65 could be replaced by a pair of two-way valves. Also, the cylinder-piston assembly shown in FIG. 2 could be replaced by any other pressure responsive device capable of transducing pressure to movement, for example a diaphragm, bellows, etc. Also, the spring 63 could be placed interiorally of the cylinder 33, as discussed above, or could be placed in any other operative position within the system to achieve the obviously intended function, and could be a tension or compression spring, as long as it is operable in opposition to the discharge pressure to return the control member 29 to the closed position thereof. Additionally, as indicated above, the piston rod 37 could be directly connected to control member 29 or could be connected thereto by means of additional or fewer intermediate structural elements than as illustrated. Further, the biasing structure 63 could be provided with adjustment means. The manual run positioning element 87 could be of a configuration other than illustrated, for example a hook configuration, a spring loaded configuration, a pin configuration, etc. Also, the element 87 could be positioned to be operable at other locations or against other elements than lever arm 41.

What I claim is:

1. A compact, portable water purification system for producing potable drinking water from contaminated or turbid water, said system comprising:

pump means having a suction inlet and a pressure discharge for withdrawing contaminated or turbid water from a source thereof and for discharging said water at an operational pressure;

strainer means for receiving said water from said pump means and for straining said water;

prefilter means for receiving said water from said strainer means and for removing particles from said water;

primary filter means for receiving said water from said prefilter means and for filtering bacteria from said water;

purifier means for receiving said water from said primary filter means and for purifying said water to remove therefrom residual bacteria and viral pathogens and for discharging said water as potable drinking water;

engine means for driving said pump means, said engine means being operable by an engine operating fluid, said engine means including control member means for controlling the supply of said engine operating fluid to said engine means, said control member means being movable between a first position, whereat said control member means allows access of said engine operating fluid to said engine means and thereby enables operation of said engine means and thus of said pump means, and a second position, whereat said control member means blocks access of said engine operating fluid to said engine means and thereby prevents operation of said engine means and thus of said pump means; and shut down means for, upon the removal or substantial reduction of suction at said inlet of said pump means, automatically terminating operation of said engine means and thereby said pump means and for thus preventing damage to said pump means, said shut down means comprising:

pressure responsive means, operatively connected to said control member means and to said discharge of said pump means to be responsive to the discharge pressure thereat, for moving said control member means to said first position thereof when said discharge pressure is above a predetermined level;

biasing means, operatively connected to said control member means and operable in opposition to said discharge pressure, for immediately and rapidly moving said control member means to said second position thereof when said discharge pressure drops below the predetermined level as a result of the removal or substantial reduction of suction at said inlet of said pump means; and draining means for selectively draining said pressure responsive means of water therein as a result of the connection thereof to said discharge of said pump means.

2. A system as claimed in claim 1, wherein said pressure responsive means comprises a cylinder, a piston movable within said cylinder, a piston rod connected to said piston and extending outwardly of said cylinder, means connecting said piston rod to said control member means, and passage means for supplying said discharge pressure to said cylinder, such that said discharge pressure moves said piston and said piston rod with respect to said cylinder.

3. A system as claimed in claims 1 or 2, wherein said biasing means comprises a spring.

4. A system as claimed in claim 2, wherein said connecting means comprises a lever arm having a first end pivotally connected to said piston rod and a second end operatively connected to said control member means, said lever arm being pivotally mounted at a position between said first and second ends thereof about a fixed pivot.

5. A system as claimed in claim 4, wherein said connecting means further comprises a lever rod having a first end pivotally connected to said second end of said lever arm and a second end, and a valve lever having a first end pivotally connected to said second end of said lever rod and a second end fixedly connected to said control member means.

6. A system as claimed in claim 4, wherein said biasing means comprises a spring connected to said first end of said lever arm and operable to move said piston rod in a direction inwardly of said cylinder.

7. A system as claimed in claim 4, further comprising manual run positioning means adapted for, when operation of said engine means is stopped, being manually positioned in contact with said lever arm to maintain said lever arm in a position such that said control member means is partially moved toward said first position thereof in opposition to said biasing means, such that said engine means may then be started, whereafter running of said engine means causes said pump means to build up said discharge pressure, thereby causing said piston rod to further move said lever arm to move said control member means to said first position thereof, and thereby releasing said run positioning means from said lever arm.

8. A system as claimed in claim 2, further comprising means for selectively manually terminating the operation of said engine means.

9. A system as claimed in claim 8, wherein said terminating means comprises valve means located in said passage means for interrupting communication of said discharge pressure to said cylinder and for discharging said cylinder at said second side of said piston to a drain.

10. A system as claimed in claim 9, wherein said valve means comprises a three-way valve.

11. An engine and pump assembly comprising:

pump means including a suction inlet and a pressure discharge for discharging a liquid at an operational pressure;

engine means for driving said pump means, said engine means being operable by an engine operating fluid, said engine means including control member means for controlling the supply of said engine operating fluid to said engine means, said control member means being movable between a first position, whereat said control member means allows access of said engine operating fluid to said engine means and thereby enables operation of said engine means and thus of said pump means, and a second position, whereat said control member means blocks access of said engine operating fluid to said engine means and thereby prevents operation of said engine means and thus of said pump means; and shut down means for, upon the removal or substantial reduction of suction at said inlet of said pump means, automatically terminating operation of said engine means and thereby said pump means and for thus preventing damage to said pump means, said shut down means comprising:

pressure responsive means, operatively connected to said control means and to said discharge of said pump means to be responsive to the discharge pressure thereat, for moving said control member means to said first position thereof when said discharge pressure is above a predetermined level;

biasing means, operatively connected to said control member means and operable in opposition to said discharge pressure, for immediately and rapidly moving said control member means to said second position thereof when said discharge pressure drops below the predetermined level as a result of the removal or substantial reduction of suction at said inlet of said pump means; and draining means for selectively draining said pressure responsive means of liquid therein as a result of the connection thereof to said discharge of said pump means.

12. An assembly as claimed in claim 11, wherein said pressure responsive means comprises a cylinder, a piston movable within said cylinder, a piston rod connected to said piston and extending outwardly of said cylinder, means connecting said piston rod to said control member means, and passage means for supplying said discharge pressure to said cylinder, such that said discharge pressure moves said piston and said piston rod with respect to said cylinder.

13. An assembly as claimed in claims 11 or 12, wherein said biasing means comprises a spring.

14. An assembly as claimed in claim 12, wherein said connecting means comprises a lever arm having a first end pivotally connected to said piston rod and a second end operatively connected to said control member means, said lever arm being pivotally mounted at a position between said first and second ends thereof about a fixed pivot.

15. An assembly as claimed in claim 14, wherein said connecting means further comprises a lever rod having a first end pivotally connected to said second end of said lever arm and a second end, and a valve lever having a first end pivotally connected to said second end of said lever rod and a second end fixedly connected to said control member means.

16. An assembly as claimed in claim 14, wherein said biasing means comprises a spring connected to said first end of said lever arm and operable to move said piston rod in a direction inwardly of said cylinder.

17. An assembly as claimed in claim 14, further comprising manual run positioning means adapted for, when operation of said engine means is stopped, being manually positioned in contact with said lever arm to maintain said lever arm in a position such that said control member means is partially moved toward said first position thereof in opposition to said biasing means, such that said engine means may then be started, whereafter running of said engine means causes said pump means to build up said discharge pressure, thereby causing said piston rod to further move said lever arm to move said control member means to said first position thereof, and thereby releasing said run positioning means from said lever arm.

18. An assembly as claimed in claim 12, further comprising means for selectively manually terminating the operation of said engine means.

19. An assembly as claimed in claim 18, wherein said terminating means comprises valve means located in said passage means for interrupting communication of said discharge pressure to said cylinder and for discharging said cylinder at said second side of said piston to a drain.

20. An assembly as claimed in claim 19, wherein said valve means comprises a three-way valve.

21. An automatic shut down device for use in a system of the type including a pump having a suction inlet and a pressure discharge for discharging a liquid at an operational pressure, an engine for driving the pump, the engine being operable by an engine operating fluid, the engine including a control member for controlling the supply of the engine operating fluid to the engine, the control member being movable between a first position, whereat the control member allows access of the engine operating fluid to the engine and thereby enables operation of the engine and thus of the pump, and a second position, whereat the control member blocks access of the engine operating fluid to the engine and thereby prevents operation of the engine and thus of the pump, said automatic shut down device being operable for, upon the removal or substantial reduction of suction at the inlet of the pump, automatically terminating operation of the engine and thereby the pump, said automatic shut down device comprising:

pressure responsive means, adapted to be operatively connected to the control member of the engine and to the discharge of the pump to be responsive to the discharge pressure thereat, for moving said control member to said first position thereof when said discharge pressure is above a predetermined level;

biasing means, adapted to be operatively connected to said control member and operable in opposition to said discharge pressure, for immediately and rapidly moving said control member to said second position thereof when said discharge pressure drops below the predetermined level as a result of the removal or substantial reduction at the inlet of the pump; and draining means for selectively draining said pressure responsive means of liquid therein as a result of the connection thereof to said discharge of said pump means.

22. A device as claimed in claim 21, wherein said pressure responsive means comprises a cylinder, a piston movable within said cylinder, a piston rod connected to said piston and extending outwardly of said cylinder, means connecting said piston rod to said control member, and passage means for supplying said discharge pressure to said cylinder, such that said discharge pressure moves said piston and said piston rod with respect to said cylinder.

23. A device as claimed in claims 21 or 22, wherein said biasing means comprises a spring.

24. A device as claimed in claim 22, wherein said connecting means comprises a lever arm having a first end pivotally connected to said piston rod and a second end operatively connected to said control member, said lever arm being pivotally mounted at a position between said first and second ends thereof about a fixed pivot.

25. A device as claimed in claim 24, wherein said connecting means further comprises a lever rod having a first end pivotally connected to said second end of said lever arm and a second end, and a valve lever having a first end pivotally connected to said second end of said lever rod and a second end fixedly connected to said control member.

26. A device as claimed in claim 24, wherein said biasing means comprises a spring connected to said first end of said lever arm and operable to move said piston rod in a direction inwardly of said cylinder.

27. A device as claimed in claim 24, further comprising manual run positioning means adapted for, when operation of the engine is stopped, being manually positioned in contact with said lever arm to maintain said lever arm in a position such that said control member is partially moved toward said first position thereof in opposition to said biasing means, such that the engine may then be started, whereafter running of the engine causes the pump to build up said discharge pressure, thereby causing said piston rod to further move said lever arm to move said control member to said first position thereof, and thereby releasing said run positioning means from said lever arm.

28. A device as claimed in claim 22, further comprising means for selectively manually terminating the operation of the engine.

29. A device as claimed in claim 28, wherein said terminating means comprises valve means located in said passage means for interrupting communication of said discharge pressure to said cylinder and for discharging said cylinder at said second side of said piston to a drain.

30. A device as claimed in claim 29, wherein said valve means comprises a three-way valve.

* * * * *